(12) United States Patent
Matsuda et al.

(10) Patent No.: US 6,351,937 B1
(45) Date of Patent: Mar. 5, 2002

(54) GAS TURBINE PLANT

(75) Inventors: Hisashi Matsuda, Tokyo; Kazuhiro Kitayama, Yokohama; Fumio Otomo, Zama; Yoshitaka Fukuyama, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/451,869

(22) Filed: Dec. 1, 1999

(30) Foreign Application Priority Data

Dec. 1, 1998 (JP) .......................................... 10-341279

(51) Int. Cl.⁷ ............................... F02C 3/00; F02C 5/00
(52) U.S. Cl. ................ 60/39.75; 415/216.1; 416/198 R
(58) Field of Search ................... 415/216.1; 416/193 R, 416/244 A, 244 B, 201 R; 60/39.37, 39.75; 464/179, 183

(56) References Cited

FOREIGN PATENT DOCUMENTS

JP          7-91203        4/1995

OTHER PUBLICATIONS

TFE 731 Turbofan Engine, Dec. 1978, GARRET Turbine Engine Company.*

* cited by examiner

Primary Examiner—Charles G. Freay
Assistant Examiner—W. Rodriguez
(74) Attorney, Agent, or Firm—Foley & Lardner

(57) ABSTRACT

A gas turbine plant comprises an air compressor, a gas turbine combustor and a gas turbine, which are operatively connected in series. In the gas turbine plant, an air compressor shaft is accommodated in the air compressor and composed of discs piled up along an axial direction of the air compressor shaft, a gas turbine shaft is accommodated in the gas turbine and composed of discs piled up along an axial direction of the gas turbine shaft, and an intermediate shaft is interposed between the air compressor shaft and the gas turbine shaft. At least one of the discs of the air compressor shaft and the discs of the gas turbine shaft are provided with bulged portions each having approximately a hanging bell shape or trapezoidal shape.

17 Claims, 12 Drawing Sheets

GAS TURBINE PLANT

BACKGROUND OF THE INVENTION

1. Technical Field of the Invention

The present invention relates to a gas turbine plant, particularly for reducing a pressure loss at a time of using a high pressure air generated by an air compressor as a cooling medium and supplying the high pressure air to a gas turbine shaft via an intermediate shaft.

2. Related Art

In general, as shown in FIG. 20, a gas turbine plant includes an air compressor 1, a gas turbine combustor 2, and a gas turbine 3, which are operatively connected, and is constructed in a manner that an air compressor shaft 4 and a gas turbine shaft 5 are connected by means of an intermediate shaft 8 including an outer cylindrical shaft 7 coaxially arranged in an inner cylindrical shaft 6.

The air compressor 1 is provided with a plurality of air compressor moving (rotating) blades 9 and air compressor stationary blades 10 along an axial direction thereof and compresses a sucked air so as to produce a high pressure air (highly pressurized air). Further, the air compressor 1 supplies a part of the high pressure air to the gas turbine combustor 2 as an oxidizing agent so as to generate a combustion gas therein, and then, supplies the combustion gas thus generated to a gas turbine stationary blade 11 and a gas turbine moving blade 12 of the gas turbine 3 so as to perform a work of expansion.

Moreover, the air compressor 1 supplies a portion of the remainder of the high pressure air to the gas turbine shaft 5 via a clearance section 13 and a space section 14 between the air compressor shaft 4 and the outer cylindrical shaft 7 of the intermediate shaft 8 so as to cool the gas turbine rotating blade 12 and its stud section (not shown).

Then, the high pressure air after cooling the gas turbine moving blade 12 and its stud section is supplied to the next stage turbine moving blade via a passageway 15, a clearance section 16 and a central hole 17.

On the other hand, as shown in FIG. 21 and FIG. 22, the air compressor shaft 4 and the gas turbine shaft 5 are both formed like a disc 18. The disc 18 is piled up like a laminated layer along an axial direction, and then, a tie-rod (not shown) is inserted into a bolt hole 19, thus, being formed as a disc shaft. Further, as shown in FIG. 22, the air compressor shaft 4 and the gas turbine shaft 5 are both formed with a blade stud section 20 having several concave-convex portions at an edge portion of the disc 18. The blade stud section 20 is provided with the air compressor moving blade 9 and the gas turbine moving blade 12.

As described above, in the conventional gas turbine plant, the air compressor shaft 4 and the gas turbine shaft are both formed like the above-described discs 18, and then, the discs 18 are piled up along the axial direction thereby to form a disc shaft so as to reduce a weight. Further, $GD^2$ (G: gravitational acceleration; D: diameter of disc) is made relatively little, and a high speed rotation is stably performed.

By the way, in a recent gas turbine plant, in order to make high an output power per single plant, the gas turbine plant has a tendency to be made high temperature. For this reason, a cooling air is required much in amount so as to secure a material strength. However, in the gas turbine plant having the conventional structure, as shown in FIG. 20, when the high pressure air extracted from the air compressor moving blade 9 is supplied to the gas turbine shaft 5 as a cooling medium via the clearance section 13 and the space section 14, a swirling flow is generated. A flow of the high pressure air becomes worse resulting from the generated swirling flow, and for this reason, a pressure loss is increased. As a result, it becomes impossible to exhibit a convection cooling performance as a planned design value, thus being disadvantageous and providing a problem. In particular, recently, a capacity of single plant increases, and for this reason, even if the limited high pressure air is effectively used as a cooling medium, it is impossible to sufficiently utilize the convection cooling due to the increase of pressure loss. As a result, in the case of making the gas turbine plant high, there is an anxiety that an excessive thermal stress is locally generated in the gas turbine shaft 5, and a melting loss is generated in the gas turbine rotating blade.

SUMMARY OF THE INVENTION

It is an object of the present invention to substantially eliminate defects or drawbacks encountered in the prior art mentioned above and to provide a gas turbine plant which can reduce a pressure loss of a high pressure air so as to effectively perform cooling at a time of supplying the high pressure air extracted from an air compressor to a gas turbine shaft via an intermediate shaft so as to cool the gas turbine shaft.

This and other objects can be achieved according to the present invention by providing a gas turbine plant, comprising:

an air compressor;

a gas turbine combustor;

a gas turbine, the air compressor, the gas turbine combustor and the gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft are provided with bulged portions.

In a preferred embodiment, the bulged portion is formed so as to provide a hanging bell shape or trapezoidal shape.

In another preferred embodiment, each of the discs is integrally formed with a step-shaped flat portion to which a guide passage is formed.

In this embodiment, the guide passage is linearly formed towards a radial direction of the disc. The guide passage is provided, on an inner diameter side thereof, with a bent passage bent to a rotating direction of the disc. The guide passage is provided, on an outer diameter side thereof, with a bent passage bent to a direction reverse to the rotating direction of the disc. The intermediate portion between these inner and outer diameter sides may be formed to be linear.

The guide passage is formed so as to provide a convex curved surface which extends from the inner diameter side towards the outer diameter side in the reverse direction side. The step-shaped flat portion may be formed with a passage member to which the guide passage is formed.

In a further preferred embodiment, the intermediate shaft has an end face to which a projection piece is formed, the projection piece being formed with a guide passage. The guide passage formed to the projection piece is linearly formed towards a radial direction of the disc. The guide passage formed to the projection piece is provided, on an inner diameter side thereof, with a bent passage bent to a direction reverse to the rotating direction of the disc. The guide passage formed to the projection piece is provided, on an inner diameter side thereof, with a bent passage bent to a direction reverse to the rotating direction of the disc and also provided, on an outer diameter side thereof, with a bent passage bent to a rotating direction of the disc, and an intermediate portion between the inner and outer diameter sides is formed to be linear.

The guide passage formed to the projection piece may be formed so as to provide a convex curved surface which extends from the inner diameter side towards the outer diameter side in the reverse direction side.

The bulged portions extend in a radial direction of the discs from one side surfaces of rotation center lines of the discs.

The intermediate shaft is composed of an inner cylindrical shaft section and an outer cylindrical shaft section, at least one of which has an end face to which projection pieces are formed in an annular shape, the projection pieces being formed with guide passages.

According to the present invention of the structures and characters mentioned above, the gas turbine plant includes means (structure) for reducing the pressure loss of the high pressure air which is extracted from the air compressor stage and is supplied as a cooling medium to the gas turbine shaft, and preferably guiding the high pressure air. This means is located at least one of the discs of the air compressor shaft and the discs of the gas turbine shaft and the intermediate shaft for mutually connecting the air compressor shaft and the gas turbine shaft. Thus, it is possible to effectively perform convection cooling even if the flow rate of the high pressure air is limited and to maintain a high strength of the disc of the gas turbine shaft, and hence, to cope with high temperature of a gas turbine plant.

The nature and further characteristic features of the present invention are made clear from the following descriptions made with reference to the accompanying drawings.

DESCRIPTION OF THE PREFERRED EMBODIMENTS

Figure 1:
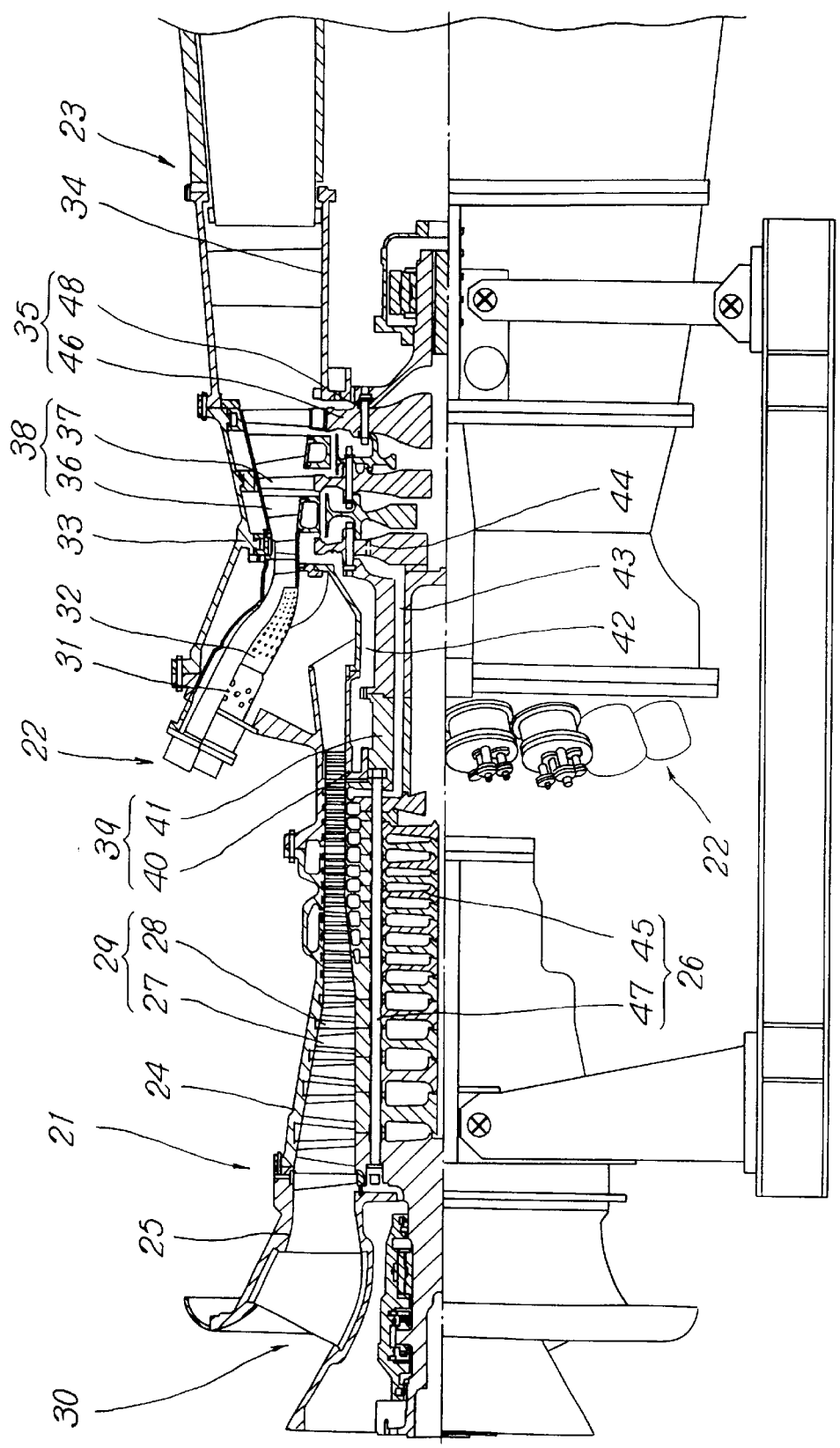
FIG. 1 is a sectional view showing an upper half portion of an assembled gas turbine plant according to the present invention.

Embodiments of a gas turbine plant according to the present invention will be described hereunder with reference to the accompanying drawings and reference numerals shown in the drawings.

With reference to FIG. 1, the gas turbine plant according to the present invention is constructed with an air compressor 21, a gas turbine combustor 22 and a gas turbine 23, which are operatively connected in series.

The air compressor 21 is accommodated in an air compressor casing 24 at the center of the casing and includes an air compressor shaft 26 supported by a journal bearing 25. An air compressor moving (rotating) blade 27 attached to the air compressor shaft 26 and an air compressor stationary blade 28 fixedly attached to the air compressor casing 24 constitute an air compressor stage 29. An air sucked from an intake port 30 is compressed by means of the air compressor stage 29 so that a high pressure air is generated.

The gas turbine combustor 22 is provided with a combustor liner 31 and a transition piece 32 in its interior and adapted to add a fuel to the high pressure air supplied from the air compressor 21 so that a combustion gas is generated in the combustor liner 31. The combustion gas is supplied to the gas turbine 23 via the transition piece 32.

The gas turbine 23 is accommodated in a gas turbine casing 33 at the center of the casing and includes a gas turbine shaft 35 supported by a journal bearing 34. A gas a turbine stationary blade 36 fixedly attached to the gas turbine casing 33, and a gas turbine moving (rotating) blade 37 attached to the gas turbine shaft 35 constitute a gas turbine stage 38. In the gas turbine stage 38, a work of expansion is performed with the use of a combustion gas supplied from the transition piece 32 so as to drive driven equipments (not shown) such as a generator or the like.

An intermediate shaft 39 is interposed between the air compressor shaft 26 and the gas turbine shaft 35. The intermediate shaft 39 is composed of an inner cylindrical shaft 40 and an outer cylindrical shaft 41 which are coaxially arranged. Further, through the intermediate shaft 39, a portion of the high pressure air extracted from the air compressor stage 29 is supplied as a cooling air to the gas turbine moving blade 37 attached to the gas turbine shaft 35 via an outer cylindrical shaft space section 42 so as to cool a stud section of the gas turbine moving blade 37. Furthermore, the remainder of the high pressure air is supplied to the gas turbine moving blade 37 via an inner cylindrical shaft space section 43 and a balance hole 44 of the gas turbine shaft 35 so as to cool a stud section of the next stage gas turbine moving blade 37.

On the other hand, the air compressor shaft 26 and the gas turbine shaft 35 are both constructed in the following manner. That is, discs 45 and 46 are piled up along an axial direction, and then, the discs 45 and 46 thus piled up is coupled with each other by means of tie bolts 47 and 48, respectively, thereby to form a rotor. The discs 45 and 46 may be said, in the above meaning, as disc units or disc assemblies.

Figure 2:
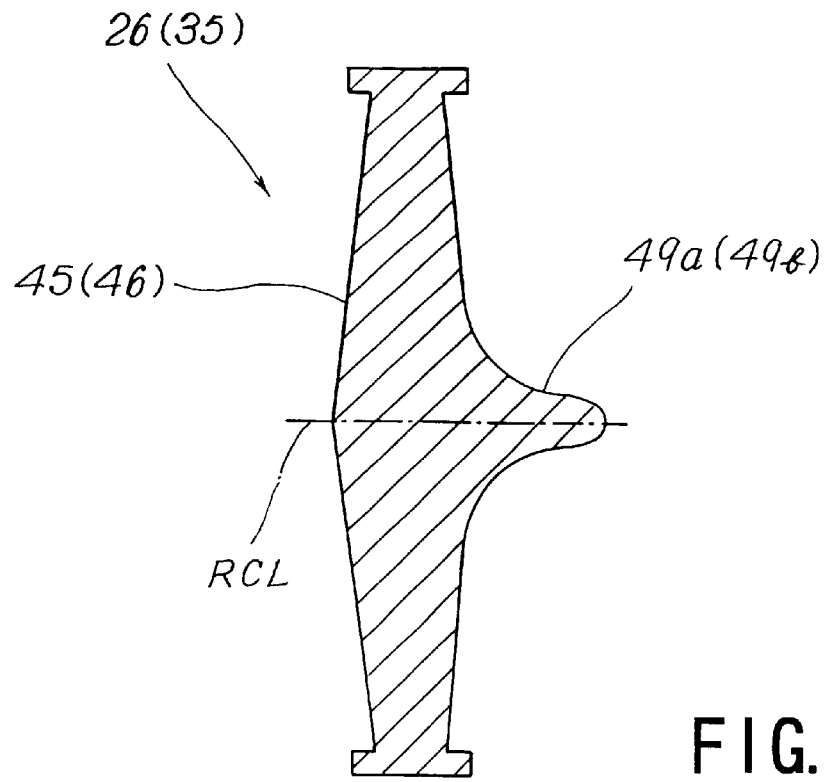
FIG. 2 is a sectional side view schematically showing a first embodiment of a disc which is applied as an air compressor shaft and a gas turbine shaft of the gas turbine plant according to the present invention.

Further, as shown in FIG. 2, the air compressor shaft 26 and the gas turbine shaft 35 both have hanging bell-like bulged portions 49a and 49b which extend towards a radial direction from at least one side of a rotating center line RCL of the coupled discs 45 and 46. The bulged portions 49a and 49b serve to preferably guide the high pressure air, which is extracted from the air compressor stage 29 and is used as a cooling medium, to the outer cylindrical shaft space section 42 of the intermediate shaft 39 and the inner cylindrical shaft space section 43 thereof, respectively. Furthermore, the bulged portions 49a and 49b serve to preferably guide the high pressure air, which is supplied as a cooling medium from each of the outer cylindrical shaft space section 42 of the intermediate shaft 39 and the inner cylindrical shaft space section 43 thereof to the discs 46 of the gas turbine shaft 35.

Conventionally, a high pressure air, flowing as a cooling medium along the rotating discs 45 and 46, is flown towards the radial direction (radiant direction) of the discs by a centrifugal force generated during the rotation of the discs. For this reason, a flow for compensating for the blown fluid rate is inevitably generated towards the rotating center line RCL of the discs 45 and 46. In this case, if a distance between the discs 45 and 46 and a wall as a stationary portion facing these discs is wide, for example, as described in the document "Boundary-Layer Theory (7th Edition, PP 102, H. Schlicting, 1979), the fluid flows towards the axial direction of the rotating center line RCL. Conversely, if the distance between the discs 45 and 46 and a wall as a stationary portion facing these discs is narrow, the fluid flows towards the rotating direction in parallel with the discs 45 and 46 along the wall, and then, is combined with the aforementioned flow towards the axial direction, hence, constituting a complicated three-dimensional flow. The air compressor 21 and the gas turbine plant 23 each have a complicated internal structures having many restraint walls. Accordingly, a flow of the fluid along the discs 45 and 46 becomes more complicated than the flow described above. However, the discs 45 and 46 are provided with guide portions.

This embodiment has been made in consideration of the above point, and the discs 45 and 46 are provided with hanging bell-shaped bulged portions 49a and 49b which extend towards the radial direction from at least one side of the rotating center line RCL of the formed discs 45 and 46.

Figure 3:
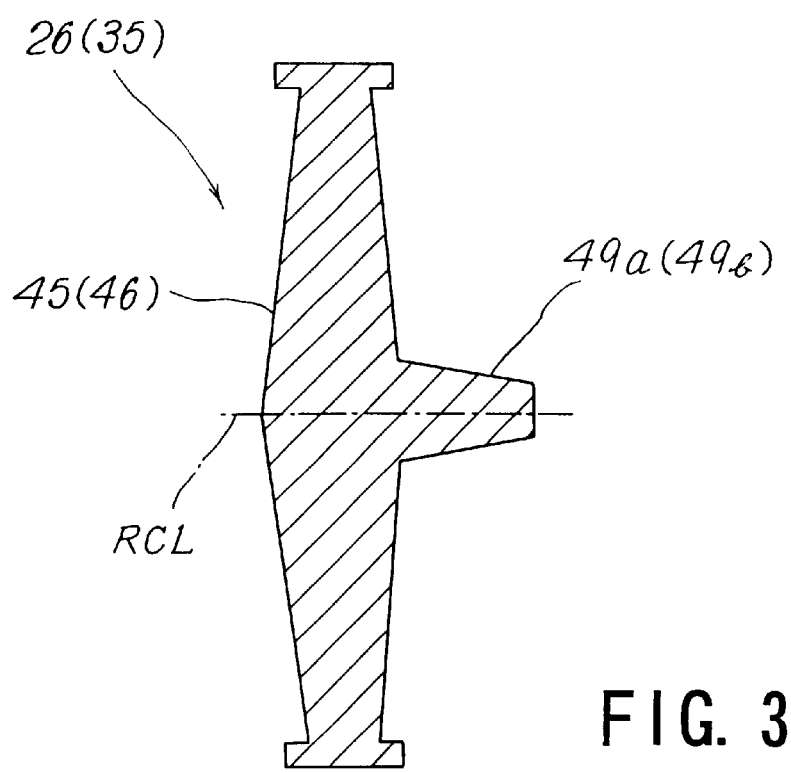
FIG. 3 is a sectional side view schematically showing a modified example of the first embodiment of the disc which is applied as an air compressor shaft and a gas turbine shaft of the gas turbine plant according to the present invention.

As described above, in this embodiment, the disks 45 and 46 of the air compressor shaft 26 and the gas turbine shaft 35 are provided with bulged portions 49a and 49b at least one side of the rotating center line RCL, respectively, and further, the high pressure air extracted from the air compressor stage 29 is preferably guided to the intermediate shaft 39 via the bulged portion 49a while the high pressure air supplied from the intermediate shaft 39 being preferably guided to the discs 46 of the gas turbine shaft 35 via the bulged portion 49b. Therefore, the high pressure air preferably flows against a centrifugal force generated during the rotation thereof so as to reduce a pressure loss, and the disc 46 of the gas turbine shaft 35 can be sufficiently subjected to the convection cooling by a limited flow rate of the high pressure air. Thus, it is possible to maintain a high strength of the disc 46 of the gas turbine shaft 35 and to cope with the tendency of the high temperature of a gas turbine plant. Moreover, in this embodiment, the hanging bell-shaped bulged portions 49a and 49b are formed at least one side of the rotating center line of the discs 45 and 46 during the rotation thereof, respectively. The present invention is not limited to this embodiment, and for example, as shown in FIG. 3, a trapezoidal bulged portions 49a and 49b may be provided.

Figure 4:
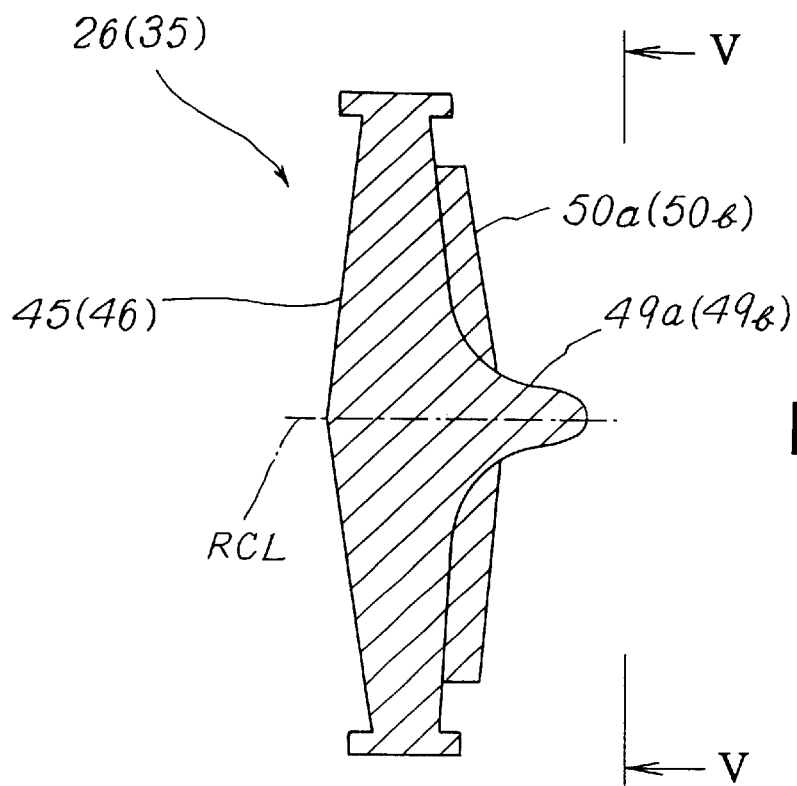
FIG. 4 is a sectional side view schematically showing a second embodiment of a disc which is applied as an air compressor shaft and a gas turbine shaft of the gas turbine plant according to the present invention.
Figure 5:
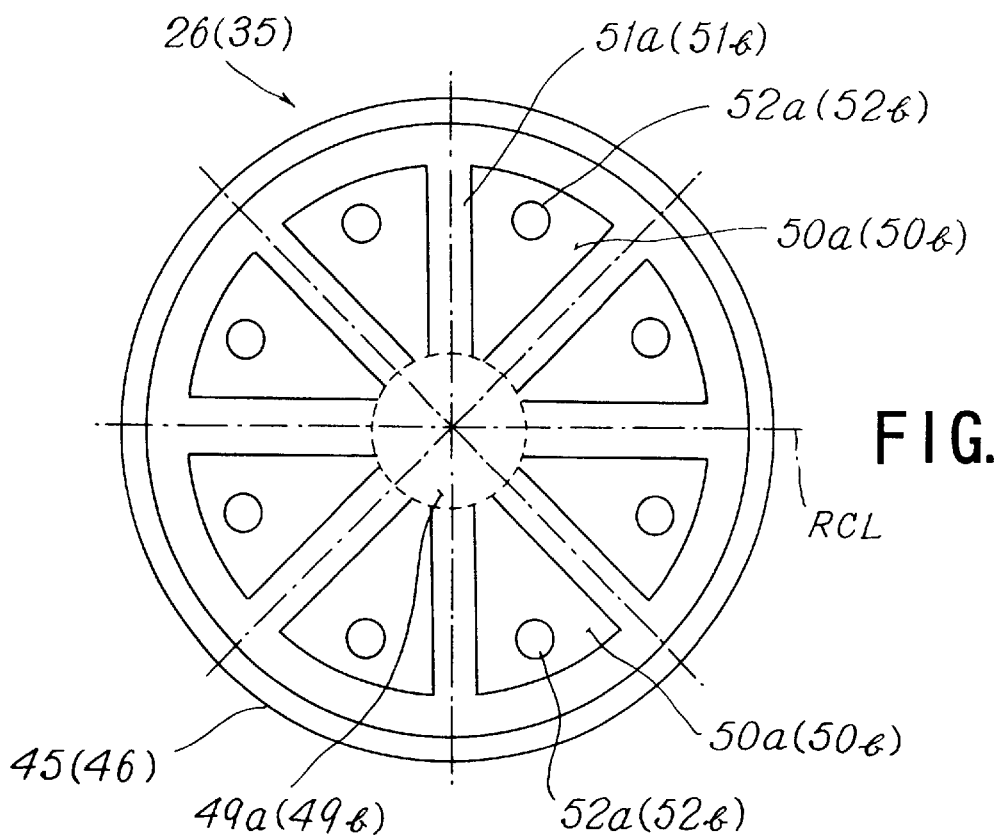
FIG. 5 is a front view showing the disc when viewed from the V—V arrow direction of FIG. 4.
Figure 6:
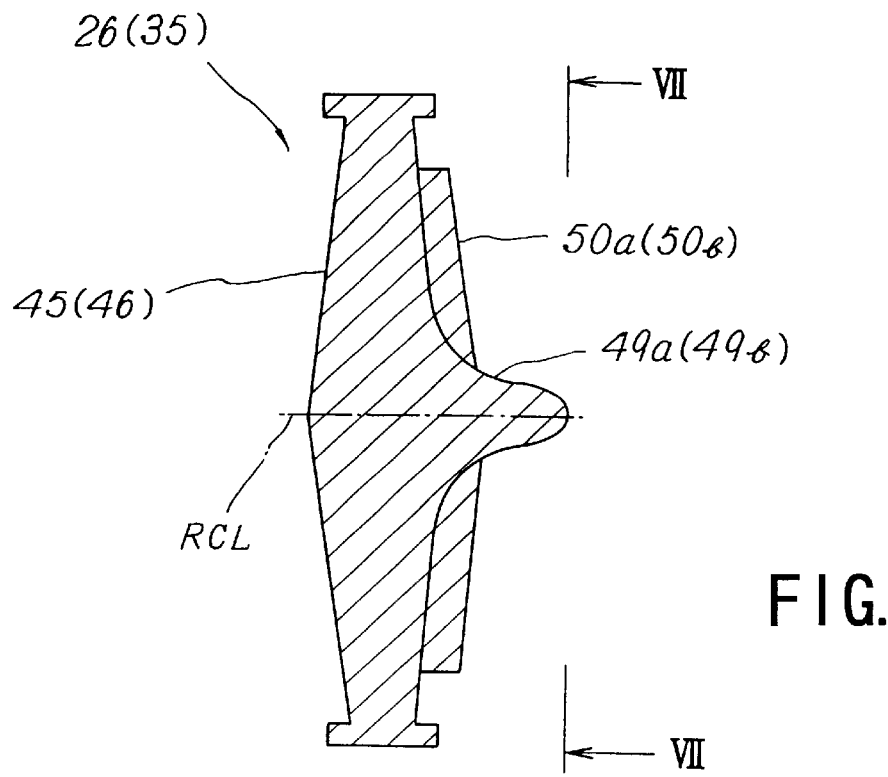
FIG. 6 is a sectional side view schematically showing a first modified example of the second embodiment of the disc which is applied as an air compressor shaft and a gas turbine shaft of the gas turbine plant according to the present invention.

FIG. 4 and FIG. 5 are views showing a second embodiment of a disc which is applied as an air compressor shaft and a gas turbine shaft of the gas turbine plant according to the present invention, in which like reference numerals are used to designate the same parts as those described in the first embodiment.

In this second embodiment of the disc, like the first embodiment, discs 45 and 46 of the air compressor shaft 26 and the gas turbine shaft 35 are provided with hanging bell-shaped or trapezoidal bulged portions 49a and 49b at least one side of the rotating center line RCL, respectively. Further, step-like (shaped) flat portions 50a and 50b are formed integrally with the discs 45 and 46, and as shown in FIG. 5, the step-like flat portions 50a and 50b are provided with guide passages 51a and 51b which linearly extend towards the radial direction (radiant direction) with reference to the rotating center line RCL. Reference numerals 52a and 52b denote bolt holes for fixing the discs 45 and 46 piled up along the axial direction by means of tie bolt.

As described above, in this embodiment, guide passages 51a and 51b are respectively formed as step-like flat portions 50a and 50b at least one side of the rotating center line of the discs 45 and 46 of the air compressor shaft 26 and the gas turbine shaft 35. Then, the high pressure air as a cooling medium extracted from the air compressor stage 29 via the discs 45 of the air compressor shaft 26 is guided to the intermediate shaft 39 without giving a swirling flow thereto, and the high pressure air guided from the intermediate shaft 39 is supplied to the discs 46 of the gas turbine shaft 35 without giving a swirling flow thereto. Therefore, it is possible to reduce the pressure loss of the high pressure air and to effectively perform the convection cooling with respect to the discs 45 and 46, thereby to maintain a high strength of the discs even if the gas turbine plant is made high temperature.

Figure 7:
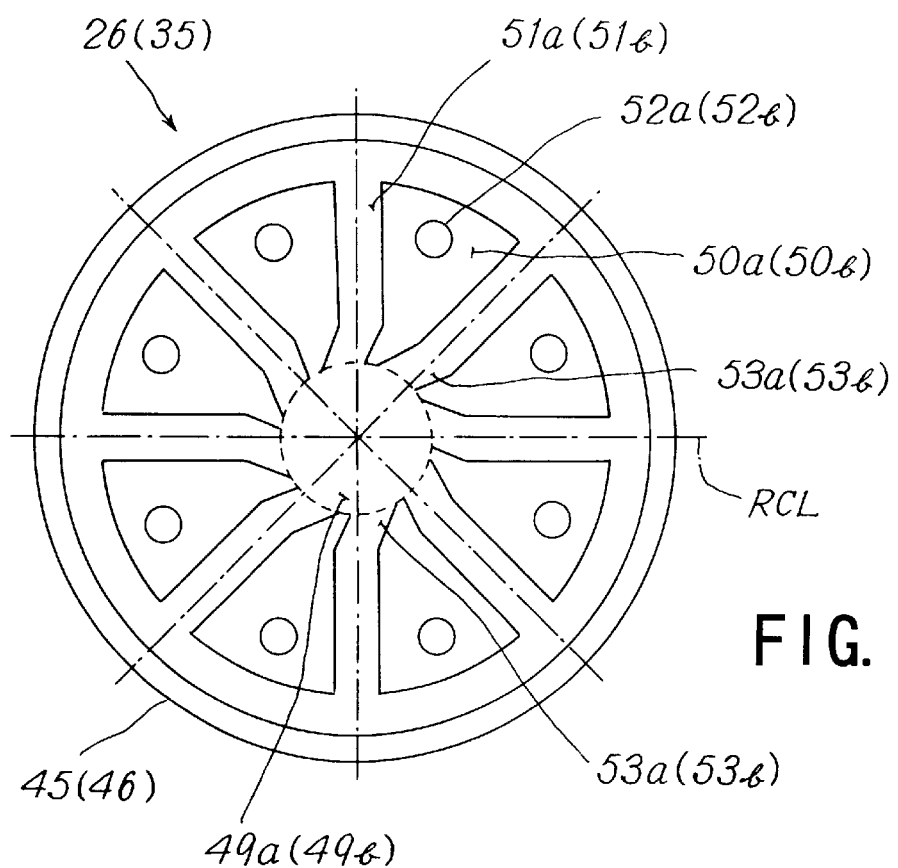
FIG. 7 is a front view showing the disc when viewed from the VII—VII arrow direction of FIG. 6.

In this embodiment, the step-like (shaped) flat portions 50a and 50b of the discs 45 and 46 are formed with the guide passages 51a and 51b, respectively. For example, as shown in FIG. 7, an inner diameter side of each of the guide passages 51a and 51b is bent to the counterclockwise direction, thereby to form bent guide passages 53a and 53b.

Further, it is to be noted that the terms "counterclockwise" and "clockwise" used hereinbefore or hereinlater are used as directions viewed from a portion between the compressor side disc and the gas turbine side disc, i.e. intermediate shaft side. However, in other words, these directions may be referred to as the rotor (disc) rotating direction and reverse direction thereof, and in modified embodiments, these terms "counter-clockwise direction" and "clockwise direction" may be substituted with for each other. That is, when the counter-clockwise direction is referred to as "rotating direction of the (rotor) disc, the clockwise direction may be referred to as "direction reverse to the disc rotating direction".

Figure 8:
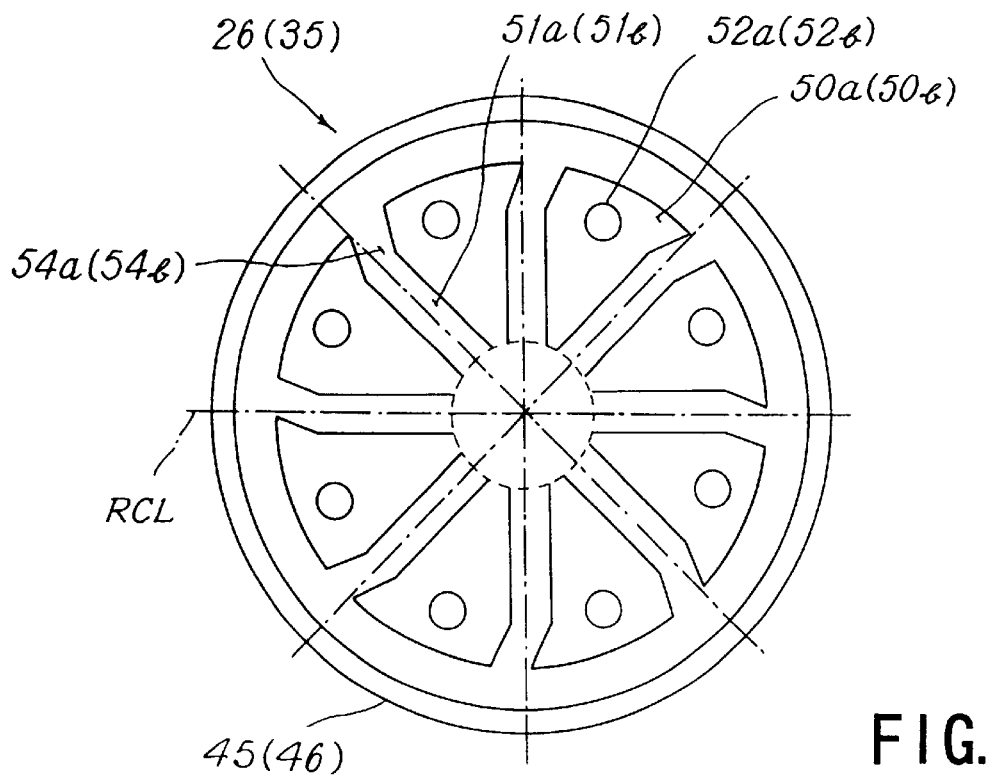
FIG. 8 is a sectional side view schematically showing a second modified example of the second embodiment of the disc which is applied as an air compressor shaft and a gas turbine shaft of the gas turbine plant according to the present invention.
Figure 9:
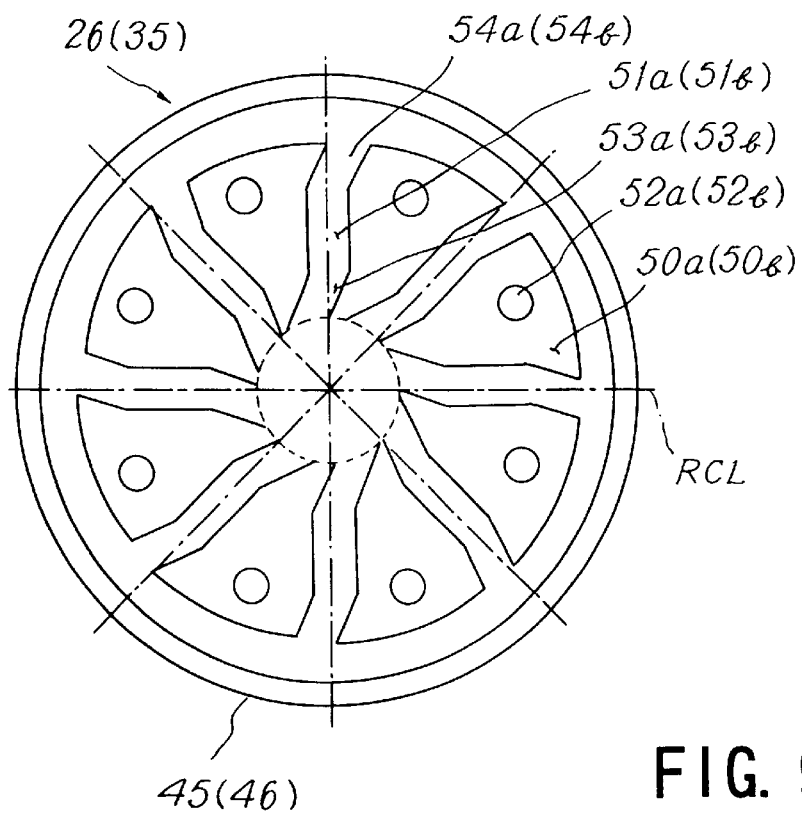
FIG. 9 is a sectional side view schematically showing a third modified example of the second embodiment of the disc which is applied as an air compressor shaft and a gas turbine shaft of the gas turbine plant according to the present invention.
Figure 10:
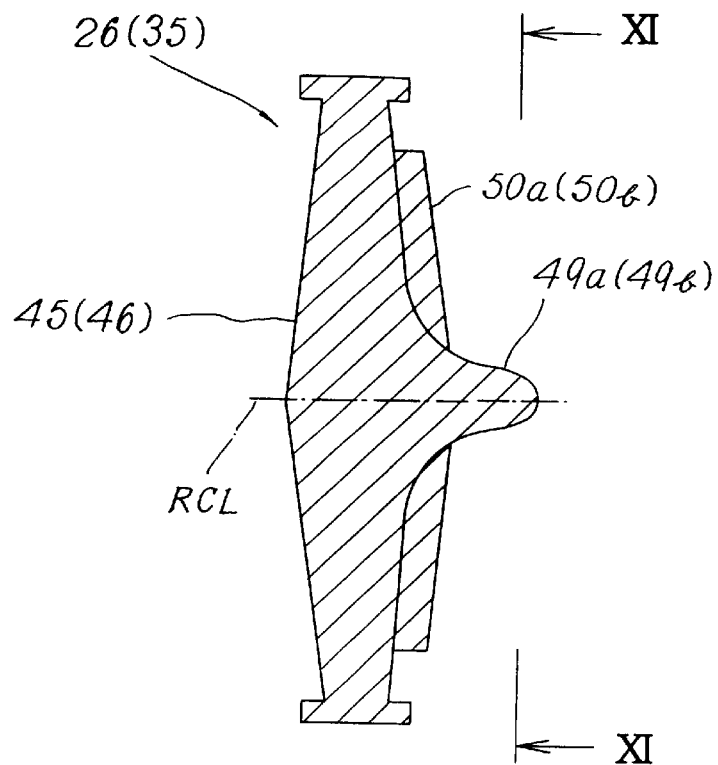
FIG. 10 is a sectional side view schematically showing a fourth modified example of the second embodiment of the disc which is applied as an air compressor shaft and a gas turbine shaft of the gas turbine plant according to the present invention.
Figure 11:
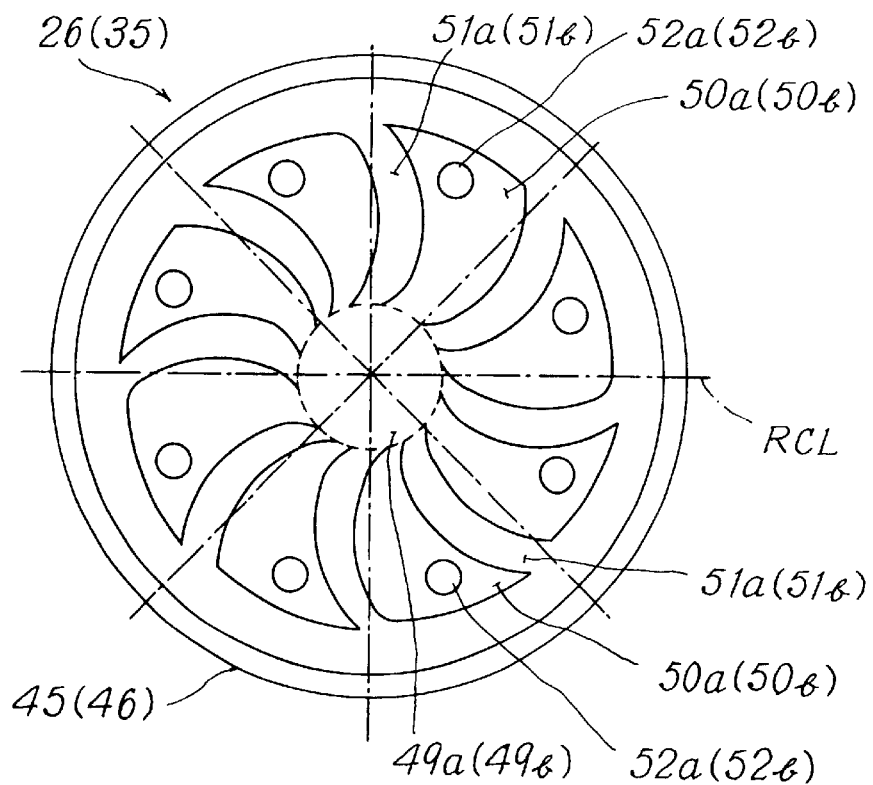
FIG. 11 is a front view showing the disc when viewed from the XI—XI arrow direction of FIG. 10.
Figure 12:
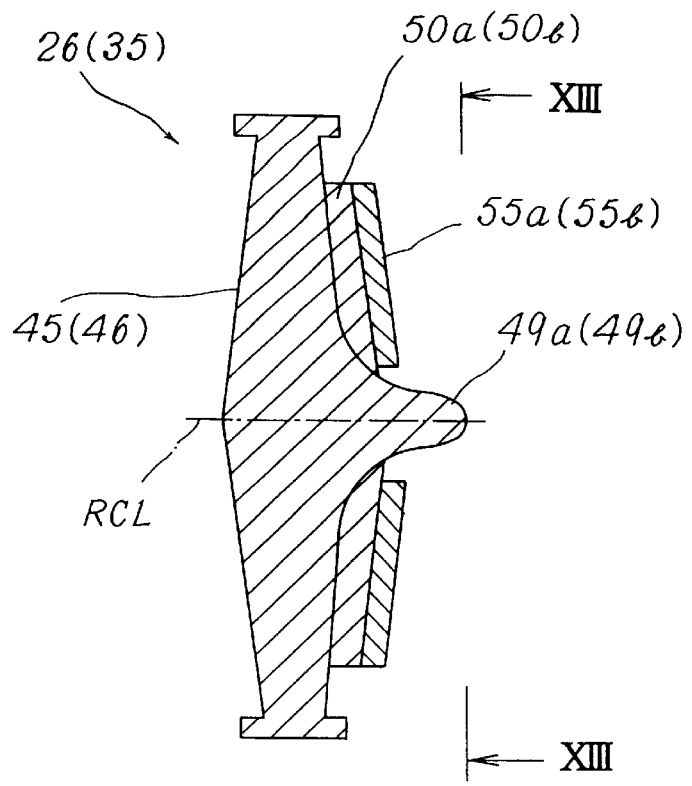
FIG. 12 is a sectional side view schematically showing a fifth modified example of the second embodiment of the disc which is applied as an air compressor shaft and a gas turbine shaft of the gas turbine plant according to the present invention.
Figure 13:
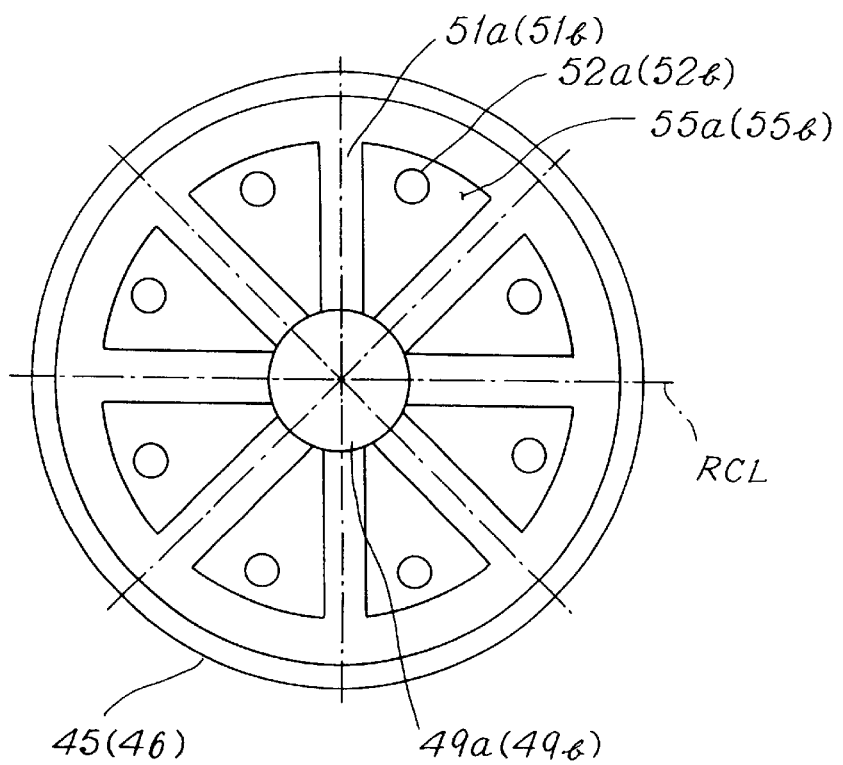
FIG. 13 is a front view showing the disc when viewed from the XIII—XIII arrow direction of FIG. 12.

Further, as shown in FIG. 8, an outer diameter side of each of the guide passages 51a and 51b is bent to the clockwise direction, thereby to form bent guide passages 54a and 54b. Furthermore, as shown in FIG. 9, the inner diameter side of the guide passages 51a and 51b is bent to the counterclockwise direction, thereby to form bent guide passages 53a and 53b, and the outer diameter side thereof is bent to the clockwise direction, thereby to form bent guide passages 54a and 54b. Thereafter, the intermediate portion between the inner and outer diameter sides may be linearly formed. Further, as shown in FIG. 10 and FIG. 11, a convex-like curve surface may be formed on the clockwise direction side from the inner diameter side of the guide passages 51a and 51b to the outer diameter side thereof. Furthermore, as shown in FIG. 12 and FIG. 13, passage members 55a and 55b are formed independently from the step-like flat portion 50a and 50b formed integrally with the discs 45 and 46, and then, the passage members 55a and 55b cover the step-like flat portion 50a and 50b, and linear (radial) guide passages 51a and 51b are formed to the passage members 55a and 55b, respectively. More particularly, a further disc, as the passage member, formed with holes are joined (bonded) to the rotor disc provided with cut groove as the cooling medium passing so as to cover the cooling passage. The passage member may be preferably formed of an ultra-stress-resisting steel.

Figure 14:
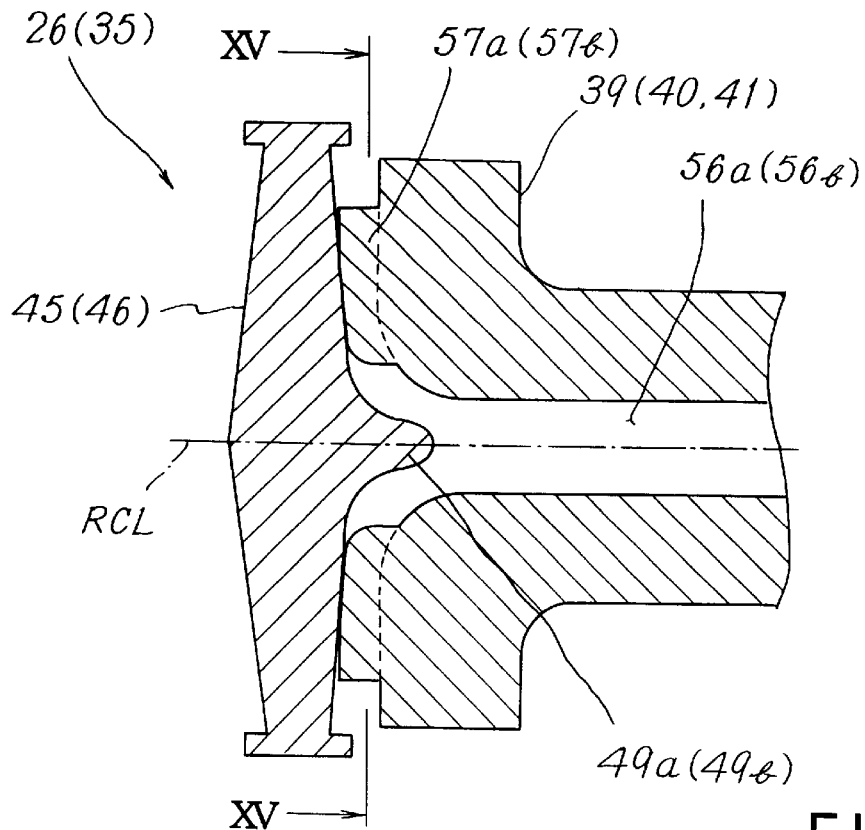
FIG. 14 is a sectional side view schematically showing a third embodiment of a disc which is applied as an air compressor shaft and a gas turbine shaft of the gas turbine plant according to the present invention.
Figure 15:
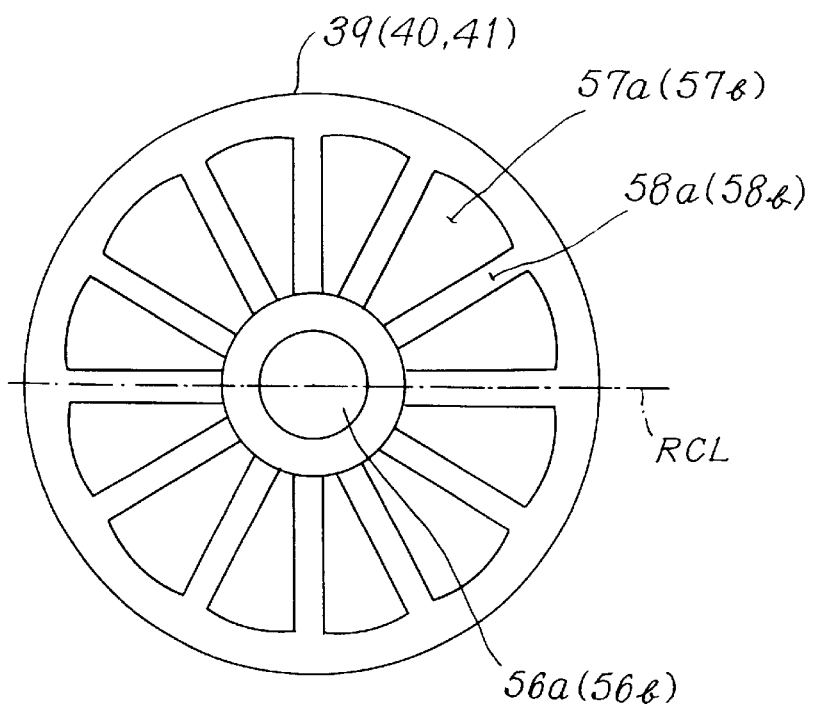
FIG. 15 is a front view showing the disc when viewed from the XV—XV arrow direction of FIG. 14.

FIG. 14 and FIG. 15 are views showing a third embodiment of a disc which is applied as an air compressor shaft and a gas turbine shaft of the gas turbine plant according to the present invention, in which same reference numerals are used to designate the same parts as those described in the first embodiment.

In this embodiment, annular projected portions (projection pieces) 57a and 57b are formed so as to face the hanging bell-shaped or trapezoidal bulged portions 49a and 49b formed at least one side of the rotating center line RCL of discs 45 and 46 of the air compressor shaft 26 and the gas turbine shaft 35 and are formed at the end surface of at least one of passages 56a and 56b of inner cylindrical shaft 40 of the outer cylindrical shaft 41 of the intermediate shaft 39. As shown in FIG. 15, linear radial passages 58a and 58b are formed from the inner diameter side of the projected portion 57a and 57b toward the outer diameter side thereof.

As described above, in this embodiment, the annular projected portions 57a and 57b are provided at the end surface of at least one of passages 56a and 56b of the inner cylindrical shaft 40 and the outer cylindrical shaft 41 of the intermediate shaft 39 in a case where a centrifugal force generated during the rotation thereof is lower than the discs 45 and 46, and the annular projected portions 57a and 57b are formed with linear guide passages 58a and 58b which extend from the inner diameter side towards the outer diameter side (radial direction) so that the high pressure air used as a cooling medium preferably flows. Therefore, it is possible to maintain a high strength of the discs 45 and 46 and to reduce the pressure loss of the high pressure air used as the cooling medium.

Figure 16:
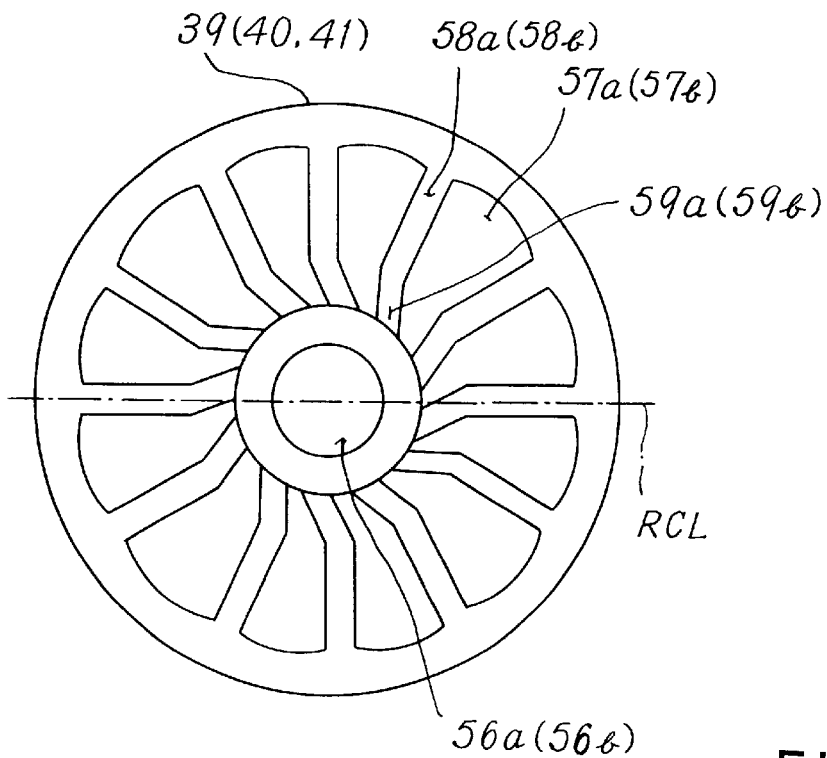
FIG. 16 is a sectional side view schematically showing a first modified example of the third embodiment of the disc which is applied as an air compressor shaft and a gas turbine shaft of the gas turbine plant according to the present invention.
Figure 17:
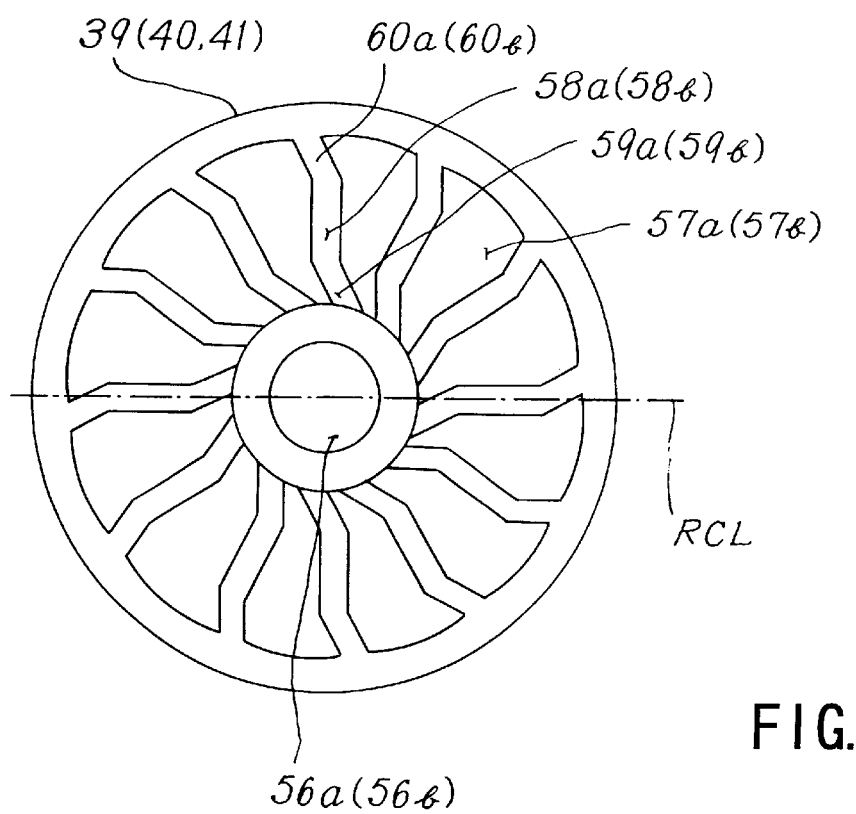
FIG. 17 is a sectional side view schematically showing a second modified example of the third embodiment of the disc which is applied as an air compressor shaft and a gas turbine shaft of the gas turbine plant according to the present invention.
Figure 18:
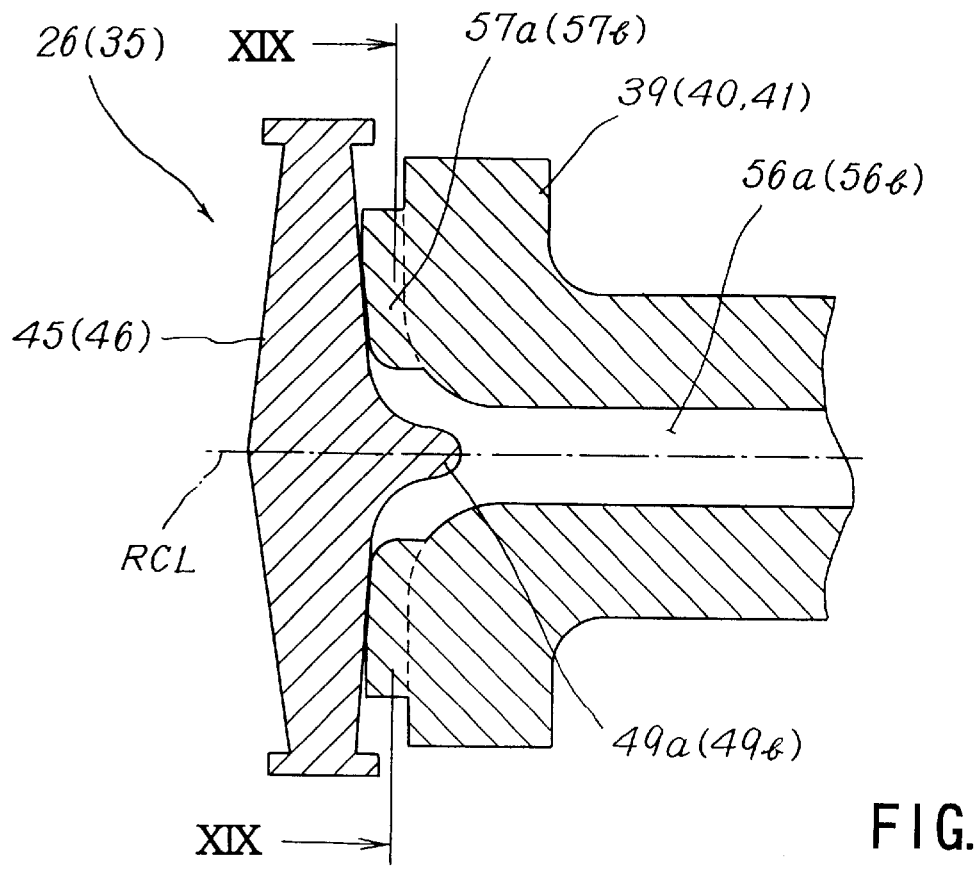
FIG. 18 is a sectional side view schematically showing a third modified example of the third embodiment of the disc which is applied as an air compressor shaft and a gas turbine shaft of the gas turbine plant according to the present invention.
Figure 19:
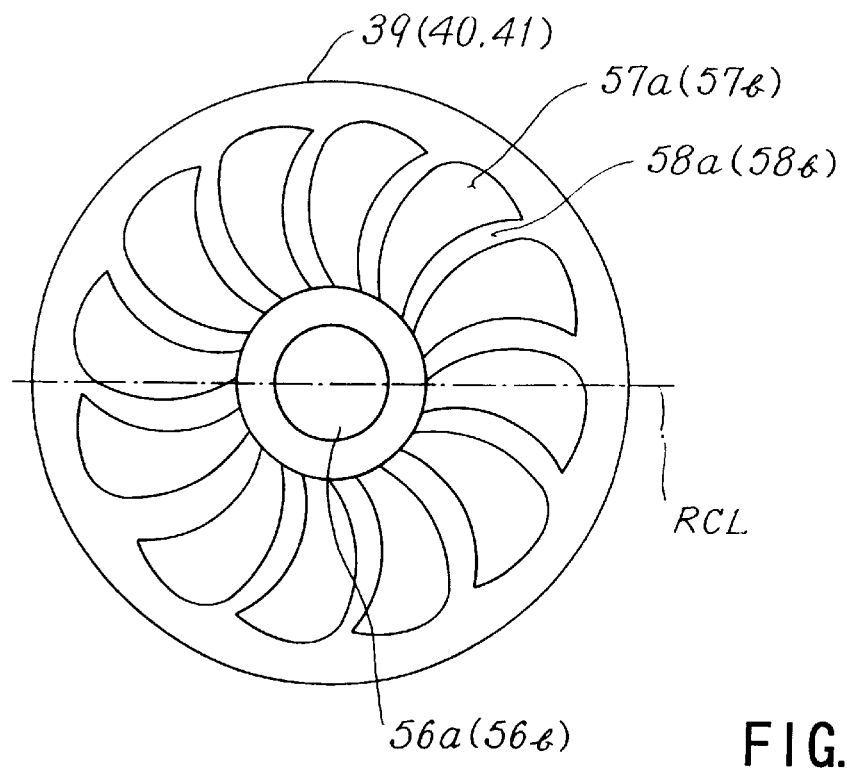
FIG. 19 is a front view showing the disc when viewed from the XIX—XIX arrow direction of FIG. 18.

Moreover, in this embodiment, the projected portions 57a and 57b have been formed with linear guide passages 58a and 58b which extend from the inner diameter side towards the outer diameter side. The present invention is not limited to this embodiment, and for example, as shown in FIG. 16, an inner diameter side of each of the guide passages 58a and 58b may be bent to the clockwise direction, thereby to form bent guide passages 59a and 59b. Further, as shown in FIG. 17, the inner diameter side of the guide passages 58a and 58b is bent to the clockwise direction, thereby to form bent guide passages 59a and 59b, and the outer diameter side thereof is bent to the counterclockwise direction, thereby to form bent guide passages 60a and 60b. Thereafter, the intermediate portion between the inner and outer diameter sides may be linearly formed. Furthermore, as shown in FIG. 18 and FIG. 19, a convex-like curve surface may be formed on the clockwise direction side from the inner diameter side of the guide passages 58a and 58b towards the outer diameter side thereof.

It is to be noted that the present invention is not limited to the described embodiments and many other changes and modifications may be made without departing from the scope of the appended claims.

Figure 20:
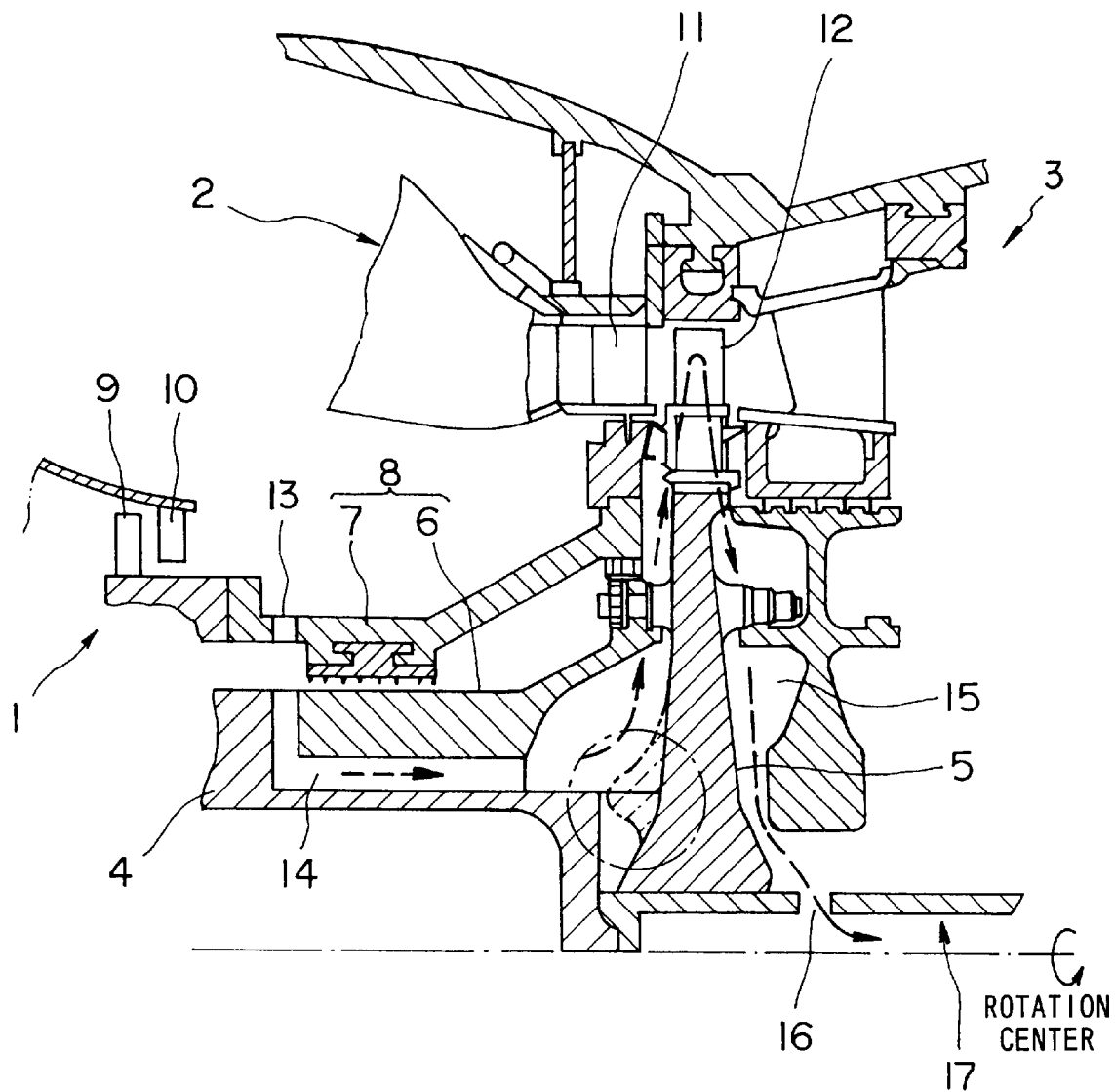
FIG. 20 is a partially sectional view schematically showing a conventional gas turbine plant.
Figure 21:
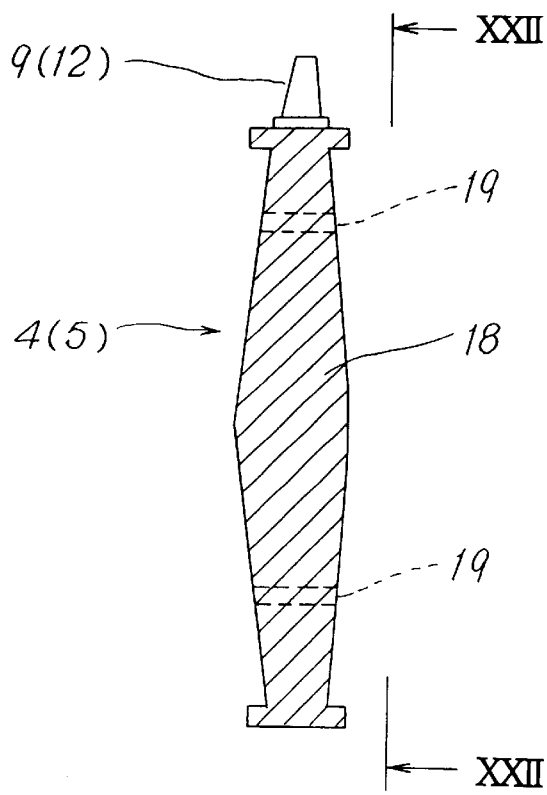
FIG. 21 is a sectional side view schematically showing a disc which is applied as an air compressor shaft and a gas turbine shaft of the conventional gas turbine plant.
Figure 22:
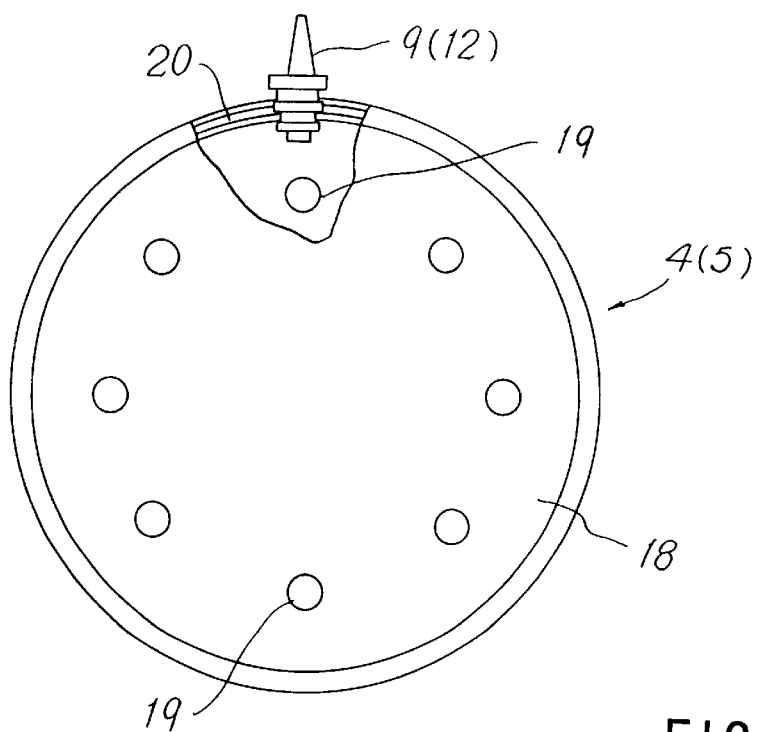
FIG. 22 is a view showing the disc as viewed from the XXII—XXII arrow direction of FIG. 21.

For example, although, in the described embodiments, the intermediate shaft having a central hollow structure was referred to, the present invention may be applicable to a conventional equipment such as shown in FIG. 20. That is, the bulged portions of the above embodiments may be formed to an encircled portion of the disc of FIG. 20 as shown with image line, and in such modification, the bulged portions provide substantially the same shapes or structures as those mentioned hereinbefore.

What is claimed is:

1. A gas turbine plant comprising:
   an air compressor;
   a gas turbine combustor;
   a gas turbine, said air compressor, said gas turbine combustor and said gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft is provided with a coaxial, air guiding, bulged portion which is directly exposed to a flow of high pressure air extracted from said air compressor, and which redirects the flow of high pressure air into a passage structure associated with said intermediate shaft.

2. A gas turbine plant according to claim 1, wherein said bulged portion has a hanging bell shape.

3. A gas turbine plant according to claim 1, wherein said bulged portion has a trapezoidal shape.

4. A gas turbine plant comprising:

an air compressor;

a gas turbine combustor;

a gas turbine, said air compressor, said gas turbine combustor and said gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft are provided with bulged portions, and wherein each of the discs is integrally formed with a step-shaped flat portion to which a guide passage is formed.

5. A gas turbine plant according to claim 4, wherein said guide passage is linearly formed towards a radial direction of the disc.

6. A gas turbine plant according to claim 4, wherein said guide passage is provided, on an inner diameter side thereof, with a bent passage bent to a rotating direction of the disc.

7. A turbine plant according to claim 4, wherein said guide passage is provided, on an outer diameter side thereof, with a bent passage bent to a direction reverse to the rotating direction of the disc.

8. A gas turbine plant according to claim 4, wherein said guide passage is provided, on an inner diameter side thereof, with a bent passage bent to a rotating direction of the disc and also provided, on an outer diameter side thereof, with a bent passage bent to a direction reverse to the rotating direction of the disc, and an intermediate portion between said inner and outer diameter sides is formed to be linear.

9. A gas turbine plant according to claim 4, wherein said guide passage is formed so as to provide a convex curved surface which extends from the inner diameter side towards the outer diameter side in the reverse direction side.

10. A gas turbine plant according to claim 4, wherein step-shaped flat portion is formed with a passage member to which said guide passage is formed.

11. A gas turbine plant according to claim 1, wherein said intermediate shaft has an end face to which a projection piece is formed, said projection piece being formed with a guide passage.

12. A gas turbine plant according to claim 11, wherein said guide passage formed to the projection piece is linearly formed towards a radial direction of the disc.

13. A gas turbine plant comprising:

an air compressor;

a gas turbine combustor;

a gas turbine, said air compressor, said gas turbine combustor and said gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft are provided with bulged portions, wherein said intermediate shaft has an end face to which a projection piece is formed, said projection piece being formed with a guide passage, and wherein said guide passage formed to the projection piece is provided, on an inner diameter side thereof, with a bent passage bent to a direction reverse to the rotating direction of the disc.

14. A gas turbine plant comprising:

an air compressor;

a gas turbine combustor;

a gas turbine, said air compressor, said gas turbine combustor and said gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft are provided with bulged portions, wherein said intermediate shaft has an end face to which a projection piece is formed, said projection piece being formed with a guide passage, and wherein said guide passage formed to the projection piece is provided, on an inner diameter side thereof, with a bent passage bent to a direction reverse to the rotating direction of the discs and also provided, on an outer diameter side thereof, with a bent passage bent to the rotating direction of the discs, and an intermediate portion between said inner and outer diameter sides is linear.

15. A gas turbine plant comprising:

an air compressor;

a gas turbine combustor;

a gas turbine, said air compressor, said gas turbine combustor and said gas turbine being operatively connected in series;

an air compressor shaft accommodated in the air compressor and composed of discs piled up along an axial direction of the air compressor shaft;

a gas turbine shaft accommodated in the gas turbine and composed of discs piled up along an axial direction of the gas turbine shaft; and an intermediate shaft interposed between the air compressor shaft and the gas turbine shaft, wherein at least one of the discs of the air compressor shaft and the discs of the gas turbine shaft are provided with bulged portions, wherein said intermediate shaft has an end face to which a projection piece is formed, said projection piece being formed with a guide passage, and wherein said guide passage formed to the projection piece is formed so as to provide a convex curved surface which extends from the inner diameter side towards the outer diameter side in the reverse direction side.

16. A gas turbine plant according to claim 1, further comprising radially extending bulged portions extending in a radial direction of the discs.

17. A gas turbine plant according to claim 1, wherein said intermediate shaft is composed of an inner cylindrical shaft section and an outer cylindrical shaft section, at least one of which has an end face to which projection pieces are formed in an annular shape, said projection pieces being formed with guide passages.

* * * * *